United States Patent Office 2,977,371
Patented Mar. 28, 1961

2,977,371
PROCESS FOR PREPARATION OF 2-OXAZOLIDONES

Stanley Dixon, Brandywine Hundred, Del., assignor to E. I. du Pont de Nemours and Company, Wilmington, Del., a corporation of Delaware No Drawing. Filed Apr. 13, 1959, Ser. No. 805,668

6 Claims. (Cl. 260—307)

This invention relates to a process for preparing 2-oxazolidones and more particularly to a process for preparing 2-oxazolidones from epoxides and trimers of organic isocyanates.

It is an object of the present invention to provide a process for preparing 2-oxazolidones. A further object is to provide a process for preparing 2-oxazolidones from epoxides and trimers of organic isocyanates. Other objects will appear hereinafter.

These and other objects of this invention are accomplished by the process comprising heating a mixture of an organic isocyanate trimer with an epoxide and if desired, a catalyst, and recovering the 2-oxazolidone thereby obtained.

The isocyanate trimers (sometimes called isocyanurates) which are used in the process of this invention are s-triazine-2,4,6(1H,3H,5H)triones and may be represented by the formula

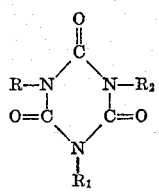

wherein R, $R_1$ and $R_2$ are monovalent organic radicals bearing no epoxide reactable groups. These radicals need not be the same in each compound. The R's may be aliphatic, aromatic, mixed aliphatic-aromatic, or organic polymer radicals have molecular weights below about 10,000. Representative trimers include trimethyl-s-triazine-2,4,6(1H,3H,5H)trione,
triethyl-s-triazine-2,4,6(1H,3H,5H)trione,
tribenzyl-s-triazine-2,4,6(1H,3H,5H)trione,
triallyl-s-triazine-2,4,6(1H,3H,5H)trione,
triphenyl-s-triazine-2,4,6(1H,3H,5H)trione,
tris(p-tolyl)-s-triazine-2,4,6(1H,3H,5H)trione,
tris(m-nitrophenyl)-s-triazine-2,4,6(1H,3H,5H)trione,
tris(o-chlorophenyl)-s-triazine-2,4,6(1H,3H,5H)trione,
tris(p-tert-butylphenyl)-s-triazine-2,4,6(1H,3H,5H)trione,
tris(p-phenylphenyl)-s-triazine-2,4,6(1H,3H,5H)trione,
and
tri(α-naphthyl)-s-triazine-2,4,6(1H,3H,5H)trione.

The aliphatic trimers can be prepared by heating aliphatic isocyanates in the presence of trialkylphosphines. Aromatic trimers can be made by heating aromatic isocyanates in contact with catalysts such as lead naphthenate, calcium acetate, sodium methoxide, triphenyl phosphine, diaryl allophanates or aryl urethanes.

It is to be understood that when unsymmetrical trimers are employed in the process of this invention, a product mixture of all the possible 3-substituted-2-oxazolidones may be formed. Thus 3-phenyl-2-oxazolidone, 3-p-tolyl-2-oxazolidone, and 3-m-chlorophenyl-2-oxazolidone result when 1-phenyl-3-p-tolyl-5-m-chlorophenyl-triazine-2,4,6(1H,3H,5H)trione is reacted with ethylene oxide. Mixtures of epoxides in like manner lead to mixed 2-oxazolidones; thus the reaction of triphenyl-s-triazine-2,4,6(1H,3H,5H)trione with 2 moles of ethylene oxide and 1 mole of propylene oxide results in 2 moles of 3-phenyl-2-oxazolidone and 1 mole of 4-(or 5-)methyl-3-phenyl-2-oxazolidone.

The epoxides which are used in the process of this invention may be represented by the formula

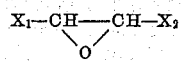

wherein $X_1$ and $X_2$ are hydrogen or organic radicals which are free of epoxide reactive groups. It is to be understood that $X_1$ and $X_2$ need not necessarily be the same in each compound. $X_1$ and $X_2$ may be joined together to form a cyclic epoxide. Representative epoxides include ethylene oxide, propylene oxide, 1,2-epoxybutane, 1,2-epoxyhexane, 1,2-epoxyoctane, 1,2-epoxyhexadecane, 2,3-epoxybutane, 3,4-epoxyhexane, 3-chloro-1,2-epoxypropane, 1,2-epoxy-5-hexene, 1,2-epoxycyclohexane, 1,2-epoxy-2-cyclohexylethane, 1,2-epoxy-2-cyclohexylpropane, and 1,2-epoxy-3-butene.

In carrying out the process of this invention, the epoxide is heated with the s-triazine-2,4,6(1H,3H,5H)trione and the resulting 2-oxazolidone then recovered. The reaction can be carried out at a temperature between about 150 to 250° C. At temperatures between 150–220° C. it is necessary to use a catalyst such as a naphthenate metal salt or a tri(lower alkyl)phosphine in order that the reaction be completed in a few hours. At temperatures above about 220° C. it is not necessary to use a catalyst. In general, the reaction is complete in about 1 to about 5 hours. About 3 to 6 molecules of epoxide are provided for every molecule of isocyanate trimer. The use of less epoxide results in a decreased yield of 2-oxazolidone. Excess epoxide may cause undesired side reactions.

The process of this invention may be carried out at atmospheric pressure provided the vapor pressure of the mixture of reactants is low enough. Often the reactants, particularly the epoxides, are too volatile in which event the reaction is conducted at superatmospheric pressure. Such a reaction may be carried out in an autoclave or rocker bomb. In general, the reactor will have an inert lining such as glass, enamel, stainless steel or lead. It is not necessary to use any higher pressure than that exerted by the reaction mixture at the operating temperature. When the formation of the 2-oxazolidone consumes a more volatile reactant, the drop in pressure may be used to follow the progress of the reaction.

In general the reactants are mixed at temperatures below about 150° C. and brought to the operating temperature by application of external heat. If desired, the reactants may be heated separately to the desired operating temperature and then introduced in stoichiometric proportions into an agitated reactor at the reaction temperature. The simultaneous additions may be made rapidly and conveniently. The conversion of the trimer to the 2-oxazolidone occurs in a few minutes at temperatures in the neighborhood of 230° C.

When a catalyst is employed, it may be added at any time; thus it can be introduced into the isocyanate trimer, or the epoxide, or both prior to mixing or it can be added to the reaction mixture below or at the desired operating temperature. Catalysts which may be used include the metal salts of carboxylic acids, tertiary organic amines, tri(lower alkyl)phosphines, tri(lower alkyl)arsines, lithium halides, and transition metal chelates. It is to be understood that these catalysts contain no epoxide reactable substituents or any groups bearing active hydrogen atoms (e.g. amido, amino, arsinico, arsino, arsono, arsylene, carbamyl, diazoamino, hydrazino, hydrazo, hydrazono, hydroxamino, hydroxyl, imido, imino, isonitro, isonitroso, mercapto, nitramino, oxamyl, phosphinico, phosphino, phosphono, selenino, selenono silenyl, semicarbozido, silicono, silicyl, silicylene, stannyl, stibinico, stibino, stibono, stibylene, sulfamino, sulfamyl, sulfino, sulfo, sulfonamido, thiocarbamyl triazeno, ureido and urethaneo). In general about 0.01 to 5% catalyst is used by weight of the reaction mixture. The preferred concentration ranges from about 0.5 to 2% by weight. The preferred catalyst is lead naphthenate. The basic metal salts of carboxylic acid which may be used are made by reacting an aliphatic or aromatic carboxylic acid with oxides or hydroxides of metals of groups I, IA, IB, II, IIA, IIB, IIIA, IIIB, IVA, VA, VB, VIA, VIB, VIIA, VIII, Al, and Pb. Representative salts are lead naphthenate, cobalt naphthenate, copper naphthenate, lead octanoate, lead linoresinate, iron linoleate, calcium acetate, potassium acetate, sodium formate, sodium methoxide, vanadium octanoate, manganese naphthenate, potassium adipate, zinc succinate, aluminum tert-butoxide, chromium linoleate, cadmium stearate, sodium benzoate, zinc stearate, lead linoleneate, cerium naphthenate, zirconium naphthenate, vanadium linoresinate. In general, the salts are made from (A) acids such as saturated monobasic aliphatic carboxylic acids, monobasic unsaturated aliphatic carboxylic acids, dibasic aliphatic acids, polybasic aliphatic acids, aromatic carboxylic acids, naphthenic acids and rosin acids; and (B) hydroxides and oxides of metals such as sodium magnesium, aluminum, potassium, calcium, scandium, titanium, vanadium, chromium, manganese, iron, cobalt, nickel, copper, zinc, gallium, rubidium, strontium, yttrium, zirconium, columbium, molybdenum, rhenium, silver, cadmium, indium, cesium, barium, lanthanum tungsten, osmium, silver, and thallium. The tertiary aliphatic amines which are useful catalysts include such compounds as trimethylamine, triethylamine, which is preferred, triisopropylamine, triisoamylamine, tri-n-hexylamine, trioctadecylamine, tribenzylamine, dimethylbenzylamine, N-methylmorpholine, N-ethylpiperidine, and N,N-dimethylpiperazine. Tertiary alkaryl and tertiary aryl amines may also be employed. This class includes such members as pyridine, alpha-picoline, N,N-dimethylaniline, N-methyl-N-ethylaniline, N,N-dimethyl-o-chloroaniline, N,N-dimethyl-p-toluidine, N,N-dimethyl-beta-naphthylamine, N-benzyl-N-ethylaniline, N,N-dibenzylaniline, and triphenylamine. Representative examples of the transition metal chelates are ferric acetyl acetonate, cobaltic acetyl acetonate, ferric isovalerylacetonate, ferric acetoacetate, nickel acetyl acetonate, cobaltic acetoacetate, ferric benzoyl acetonate, cupric acetyl acetonate, etc. In general, one may use iron, cobalt, nickel, vanadium, chromium, manganese, copper, and zinc chelates of 1,3-diketo compounds such as 1,3-diketones (e.g. acetylacetone, benzoylacetone), acetoacetic esters (e.g. methyl acetoacetate, ethyl acetoacetate, and benzyl acetoacetate), and diesters of malonic acid (e.g. diethyl malonate and phenyl ethyl malonate). Representative examples of tri(lower alkyl)phosphines and tri(lower alkyl)arsines include triethyl phosphines and triethyl arsines, respectively. Lithium chloride is a representative lithium halide.

When the process is conducted at atmospheric pressure, analysis of the products obtained from trial runs will be required to determine the time needed to complete the reaction. When a superatomspheric process is operated, the end of the reaction is usually indicated by a halt in the pressure drop. In any event, the reaction vessel is allowed to cool until it can be opened conveniently. The 2-oxazolidone obtained is purified by conventional techniques of fractional distillation and recrystallization. For example, 3-phenyl-2-oxazolidone is conveniently recovered by contacting the reaction mixture with hot tetrahydrofuran. The oxazolidone dissolves and the addition of n-hexane to the filtrate precipitates the oxazolidone which is finally recrystallized from a mixture of n-hexane and tetrahydrofuran.

The process of the present invention for preparing 2-oxazolidones may also be used to prepare 2-imidazolidones since it has been determined that in some instances this cyclic urea is obtained as a by-product. It has been determined that the way in which the trimer is formed and the temperature at which it is subsequently reacted with the epoxide will determine whether any 2-imidazolidone is obtained. Thus, when a trimer was prepared from phenyl isocyanate using a catalyst combination of phenyl ethyl urethane and N-methylmorpholine, subsequent reaction of the trimer at 230–250° C. with the epoxide produced both the 2-oxazolidone and the 2-imidazolidone. However, when this trimer was reacted with the epoxide at 150° C., only the 2-oxazolidone was formed. Furthermore, if this trimer was rigorously purified by recrystallization, subsequent reaction with epoxide at 230–250° C. produced only the 2-oxazolidone. It has been determined that the use of relatively pure trimer, no matter how prepared, will, on reaction with the epoxide, produce only the 2-oxazolidone. Addition of lead naphthenate to trimer made with a urethane catalyst, tends to decrease the proportion of 2-imidazolidone formed at 230° C.

The 2-oxazolidones, which are prepared by the process of this invention, may be defined by the formula

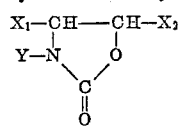

wherein $X_1$ and $X_2$ are as defined above and Y is either R, $R_1$ or $R_2$, all of which are as defined above. These 2-oxazolidones are useful as solvents and plasticizers for cellulose esters and acrylic polymers. The 2-imidazolidones, which may be obtained as a by-product in the process of this invention, may be defined by the formula

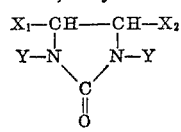

wherein $X_1$, $X_2$ and Y are as defined above. These 2-imidazolidones are useful as intermediates in that they may be hydrolyzed to form secondary diamines. They may be reduced and are then useful as fume-fading agents for dyed cellulose acetate.

The following examples will better illustrate the nature of the present invention; however, the invention is not intended to be limited to these examples. Parts are by weight unless otherwise indicated.

*Example 1*

55 grams of triphenyl-s-triazine-2,4,6(1H,3H,5H)-trione (prepared by trimerizing phenyl isocyanate with N-methylmorpholine and phenyl ethyl urethane catalyst combination) and 20 grams of ethylene oxide are agitated in a 400-cc. stainless steel bomb at 230° C. for 4 hours. After cooling, 71 grams of solid is removed which is then readily dissolved in 200 ml. of hot tetrahydrofuran. The solution obtained is filtered while hot. Treatment of the filtrate with n-hexane precipitates 64 g. of 3-phenyl-2-oxazolidone, which is a light brown solid melting at 119–120° C. (after crystallization from a mixture of tetrahydrofuran and n-hexane). The residue, which melts at 216° C. (after recrystallization from boiling tetrahydrofuran), is 1,3-diphenyl-2-imidazolidone.

*Example 2*

When rigidly purified (thrice recrystallized) triphenyl-s-triazine-2,4,6(1H,3H,5H)trione (prepared from phenyl isocyanate and a catalyst combination of ethyl urethane and N-methylmorpholine) is employed in the procedure of Example 1, 56 grams of 3-phenyl-2-oxazolidone is obtained melting at 121–122° C. No 1,3-diphenyl-2-imidazolidone is isolated.

Example 3

The procedure of Example 1 is repeated except that the triphenyl-s-triazine-2,4,6(1H,3H,5H)trione used contains about 1% by weight lead naphthenate which was employed to prepare it by catalyzing the trimerization of phenyl isocyanate. 64 grams of 3-phenyl-2-oxazolidone is isolated melting at 119–120° C. No 1,3-diphenyl-2-imidazolidone is found.

Example 4

55 grams of triphenyl-s-triazine-2,4,6(1H,3H,5H)-trione (containing about 1% by weight lead naphthenate which was used to prepare it by catalyzing the trimerization of phenyl isocyanate) is agitated for 4 hours at 150° C. with 20 grams of ethylene oxide in a 400-cc. stainless steel bomb. After cooling, 68 grams of solid is recovered which is entirely soluble in hot tetrahydrofuran. It is 3-phenyl-2-oxazolidone.

Example 5

A. To 100 grams of p-chlorophenylisocyanate is added 1 milliliter of lead naphthenate solution. Heat is evolved. After about 30 minutes a solid is obtained which is pulverized and recrystallized from chloroform. The tris(p - chlorophenyl)-s-triazine - 2,4,6(1H,3H,5H)trione obtained melts at 320° C.

B. 46 grams of the tris(p-chlorophenyl)-s-triazine-2,4,6(1H,3H,5H)trione prepared in Part A above is agitated for 4 hours at 250° C. with 20 grams of ethylene oxide in a 400-cc. stainless steel bomb. After cooling, 57 grams of dark brown solid is removed. A solution in refluxing tetrahydrofuran is agitated for 5 hours with charcoal, then filtered while hot. The filtrate is diluted with n-hexane until turbidity is observed. On cooling crystals separate melting at 104° C. When recrystallized from hot methanol they yield 40 grams of 3-(p-chlorophenyl)-2-oxazolidone as colorless needles melting at 119–120° C.

Analysis.—Calcd. for $C_9H_8NO_2Cl$: C, 54.8; H, 4.1; N, 7.1. Found: C, 54.4; H, 4.2; N, 6.8.

Example 6

71.4 grams of triphenyl-s-triazine-2,4,6(1H,3H,5H)-trione and 35.4 grams of propylene oxide are agitated at 250° C. for 6 hours in a stainless steel bomb. After cooling, 98 grams of a viscous brown liquid is removed. A boiling methanol solution of this liquid is agitated with charcoal for 3 hours and then filtered while hot. Enough water is added to the hot filtrate to produce permanent turbidity. On cooling, 34 grams of 4-(or 5-)methyl-1,3-diphenyl-2-imidazolidone precipitates melting (after recrystallization from aqueous methanol) at 121–122° C.

Analysis.—Calcd. for $C_{16}H_{16}N_2O_2$: C, 76.2; H, 6.4; N, 11.1. Found: C, 75.8; H, 6.4; N, 11.0.

Evaporation of the residual liquor yields 40 grams of 4-(or 5-)methyl-3-phenyl-2-oxazolidone, melting (after recrystallization) at 81° C. alone or in admixture with an authentic sample.

Example 7

50 grams of triphenyl-s-triazine - 2,4,6(1H,3H,5H)-trione is agitated for 4 hours at 235° C. with 42 grams of biallyl monoepoxide in a 400-cc. stainless steel bomb. After cooling, 89 grams of a black liquid is removed. Fractional distillation gives 68 grams of 3-phenyl-4-(or 5-)(4-pentenyl)-2-oxazolidone, B.P. 161–163° C. (0.15 mm. Hg).

Analysis.—Calcd. for $C_{13}H_{15}NO$: C, 71.9; H, 6.9; N, 6.5. Found: C, 71.6; H, 6.9; N, 6.5.

Example 8

A. 55 grams of pure triphenyl-s-triazine-2,4,6(1H,3H,5H)trione, 20 grams of ethylene oxide, and 1.5 grams of tri-n-butyl phosphine are heated with agitation in a 400-cc. stainless steel bomb at 150° C. for 4 hours. On cooling, the bomb is opened and the product removed therefrom is subsequently recrystallized from a mixture of tetrahydrofuran and n-hexane. 69 grams of 3-phenyl-2-oxazolidone is isolated.

B. Lead naphthenate is substituted for tri-n-butyl phosphine in procedure A above. 62 grams of the oxazolidone is obtained.

C. Triethylamine is substituted for tri-n-butyl phosphine in procedure A above. 66 grams of the oxazolidone is obtained.

D. Ferric acetyl acetonate is substituted for tri-n-butyl phosphine in procedure A above. 45 grams of the oxazolidone and 9 grams of the trimer are recovered.

E. Lithium chloride is substituted for tri-n-butyl phosphine in procedure A above. 63 grams of the oxazolidone is isolated.

F. Tetraethylammonium bromide is substituted for tri-n-butyl phosphine in the procedure of part A above. 64 grams of the oxazolidone is obtained.

Example 9

55 grams of triphenyl - s - triazine - 2,4,6(1H,3H,5H)-trione, 44 grams of 1,2-epoxycyclohexane and 2 grams of lead naphthenate are agitated at 200° C. for 4 hours in a 400-cc. stainless steel bomb. On cooling, 93 grams of a mixture of oil and solid is removed. The solid is collected by filtration and recrystallized from a mixture of tetrahydrofuran and n-hexane to yield 38 grams of unchanged triazine trione. The oil is fractionally distilled to yield 14 grams of a 3-phenyl-4,5-butylene-2-oxazolidone as a viscous pale yellow oil, B.P. 168–172° C. (0.3 mm. Hg).

Analysis.—Calcd. for $C_{13}H_{15}NO_2$: C, 72.0; H, 6.9; N, 6.5. Found: C, 72.5; H, 7.3; N, 7.0.

The infrared spectrum of the product is consistent with that of compounds having a 2-oxazolidone structure.

Example 10

55 grams of triphenyl-s-triazine-2,4,6(1H,3H,5H)-trione (containing about 1% by weight lead naphthenate which was employed to prepare it by trimerizing phenyl isocyanate), 32 grams of 1,2-epoxy-butene-3, 1 cc. of tri-n-butyl phosphine, and 0.1 g. of hydroquinone are agitated at 175° C. for 3 hours in a 400-cc. stainless steel bomb. On cooling, a viscous black liquid is removed weighing 81 grams. It is fractionally distilled to give 35 grams of 3-phenyl-4-(or 5-)vinyl-2-oxazolidone, B.P. 171–176° C. (3.5 mm. Hg), which yields white plates M.P. 87° C. when recrystallized several times from a mixture of ether and petroleum ether.

Analysis.—Calcd. for $C_{11}H_{10}NO_2$: C, 69.9; H, 5.8; N, 7.4. Found: C, 70.6; H, 5.8; N, 7.6.

As many widely different embodiments of this invention may be made without departing from the spirit and scope thereof, it is to be understood that this invention is not limited to the specific embodiments thereof except as defined in the appended claims.

I claim:

1. A process for preparing 3-phenyl-2-oxazolidone and 1,3-diphenyl-2-imidazolidone which comprises heating ethylene oxide with triphenyl-s-triazine-2,4,6-(1H,3H,5H)trione at a temperature of about 230° C.

2. A process for preparing 3-phenyl-2-oxazilidone which comprises heating ethylene oxide with triphenyl-s-triazine-2,4,6(1H,3H,5H)trione at a temperature of about 150° C. in the presence of lead naphthenate.

3. A process for preparing a 2-oxazolidone which comprises heating to a temperature of from about 150° C. to 250° C. a mixture of (a) an epoxide selected from the group consisting of ethylene oxide, propylene oxide, 1,2-epoxybutane, 1,2-epoxyhexane, 1,2-epoxyoctane, 1,2-epoxyhexadecane, 2,3-epoxybutane, 3,4-epoxyhexane, 3-chloro-1,2-epoxypropane, 1,2-epoxy-5-hexene, 1,2-epoxycyclohexane, 1,2-epoxy-2-cyclohexylethane, 1,2-epoxy-2-cyclohexylpropane, and 1,2-epoxy-3-butene and (b) an s-triazine-2,4,6-(1H,3H,5H)trione of the formula

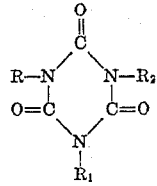

wherein R, $R_1$ and $R_2$ are monovalent organic radicals selected from the group consisting of alkyl radicals, alkenyl radicals, hydrocarbon aryl radicals, halogen-substituted hydrocarbon aryl radicals and nitro-substituted hydrocarbon aryl radicals; and recovering the 2-oxazolidone thereby obtained.

4. A process according to claim 3 wherein the heating is carried out at a temperature of from about 220° C. to 250° C. and a 2-imidazolidone is obtained in addition to the 2-oxazolidone.

5. A process according to claim 3 wherein the heating is carried out at a temperature of from about 150° C. to 220° C. in the presence of a catalyst selected from the group consisting of lead salts of hydrocarbon carboxylic acids; tertiary organic amines composed entirely of carbon, hydrogen and nitrogen; tri(lower alkyl) phosphines; tri(lower alkyl)arsines; lithium halides and transition metal chelates of β-diketones.

6. A process according to claim 5 wherein the catalyst is lead naphthenate.

References Cited in the file of this patent
UNITED STATES PATENTS

| | | |
|---|---|---|
| 2,594,979 | Nelson | Apr. 29, 1952 |
| 2,602,075 | Carpenter et al. | July 7, 1952 |
| 2,788,335 | Barthel | Apr. 9, 1957 |
| 2,799,663 | Hampton et al. | July 16, 1957 |
| 2,865,926 | Harrington | Dec. 23, 1958 |

FOREIGN PATENTS

| | | |
|---|---|---|
| 870,471 | France | Dec. 12, 1941 |

OTHER REFERENCES

Krasuskii et al.: Chem. Abstracts, vol. 31, col. 1377 (1937).

Elderfield: "Heterocyclic Compounds," vol. 5, pp. 397–8 (1957).

UNITED STATES PATENT OFFICE
CERTIFICATION OF CORRECTION

Patent No. 2,977,371                                March 28, 1961

Stanley Dixon

It is hereby certified that error appears in the above numbered patent requiring correction and that the said Letters Patent should read as corrected below.

Column 1, line 45, for "have" read -- having --; column 3, line 4, after "selenono" insert a comma; line 35, after "thanum" insert a comma; column 6, line 68, for "oxazilidone" read -- oxazolidone --.

Signed and sealed this 22nd day of August 1961.

(SEAL)
Attest:

ERNEST W. SWIDER                                      DAVID L. LADD
Attesting Officer                                           Commissioner of Patents